March 11, 1958 W. M. MILLER 2,826,204
THRESHER HAVING PNEUMATIC SPREADER
Filed June 9, 1955 4 Sheets-Sheet 1
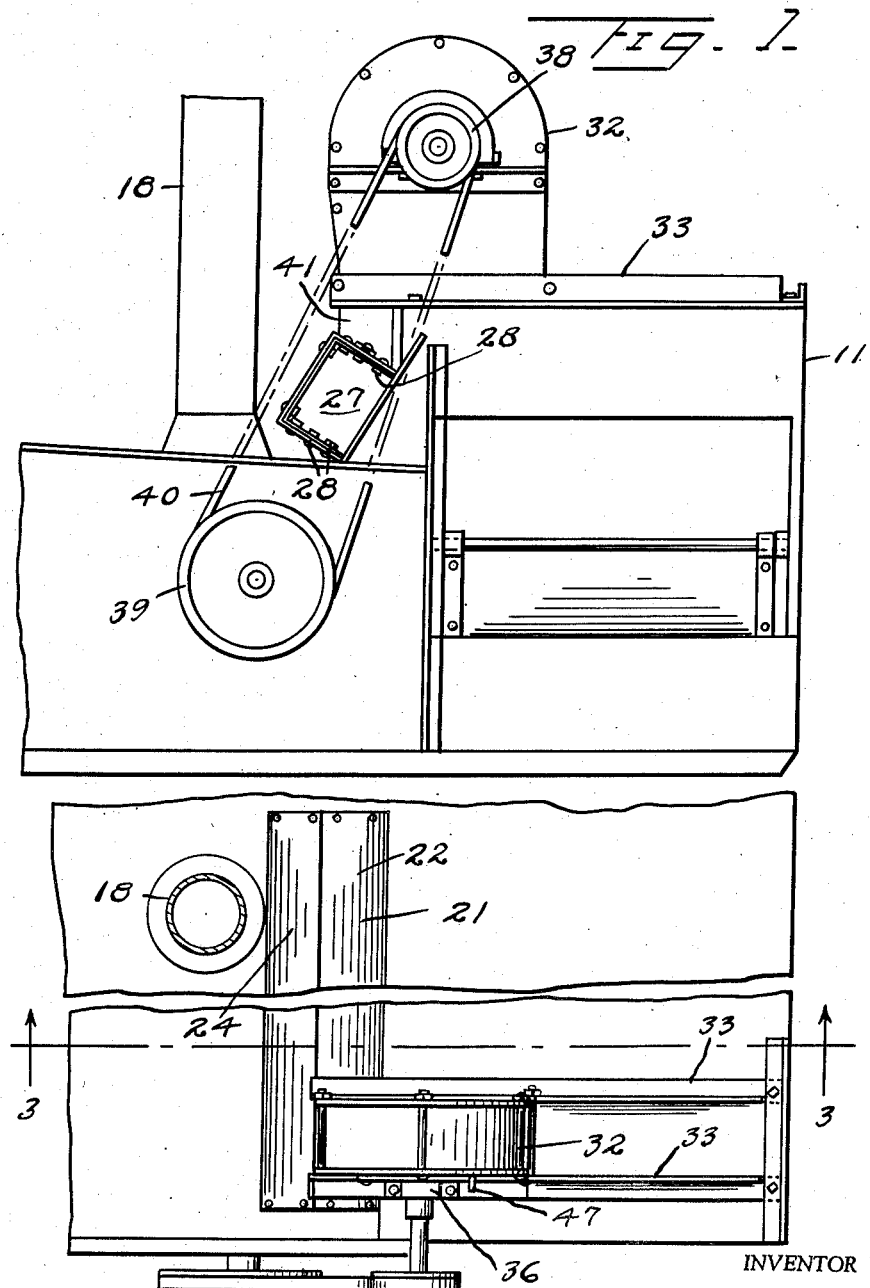
INVENTOR
W. M. Miller
BY Kimmel & Crowell
ATTORNEYS

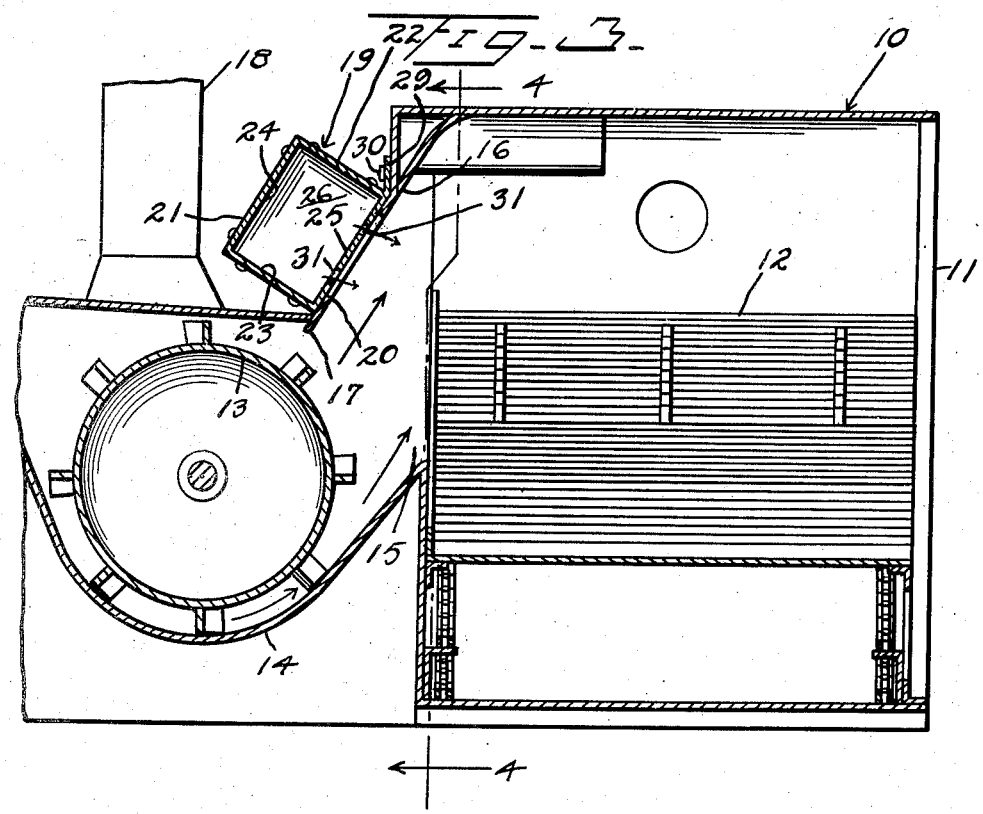
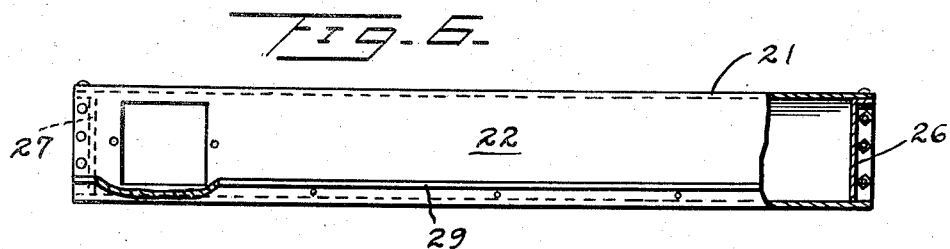

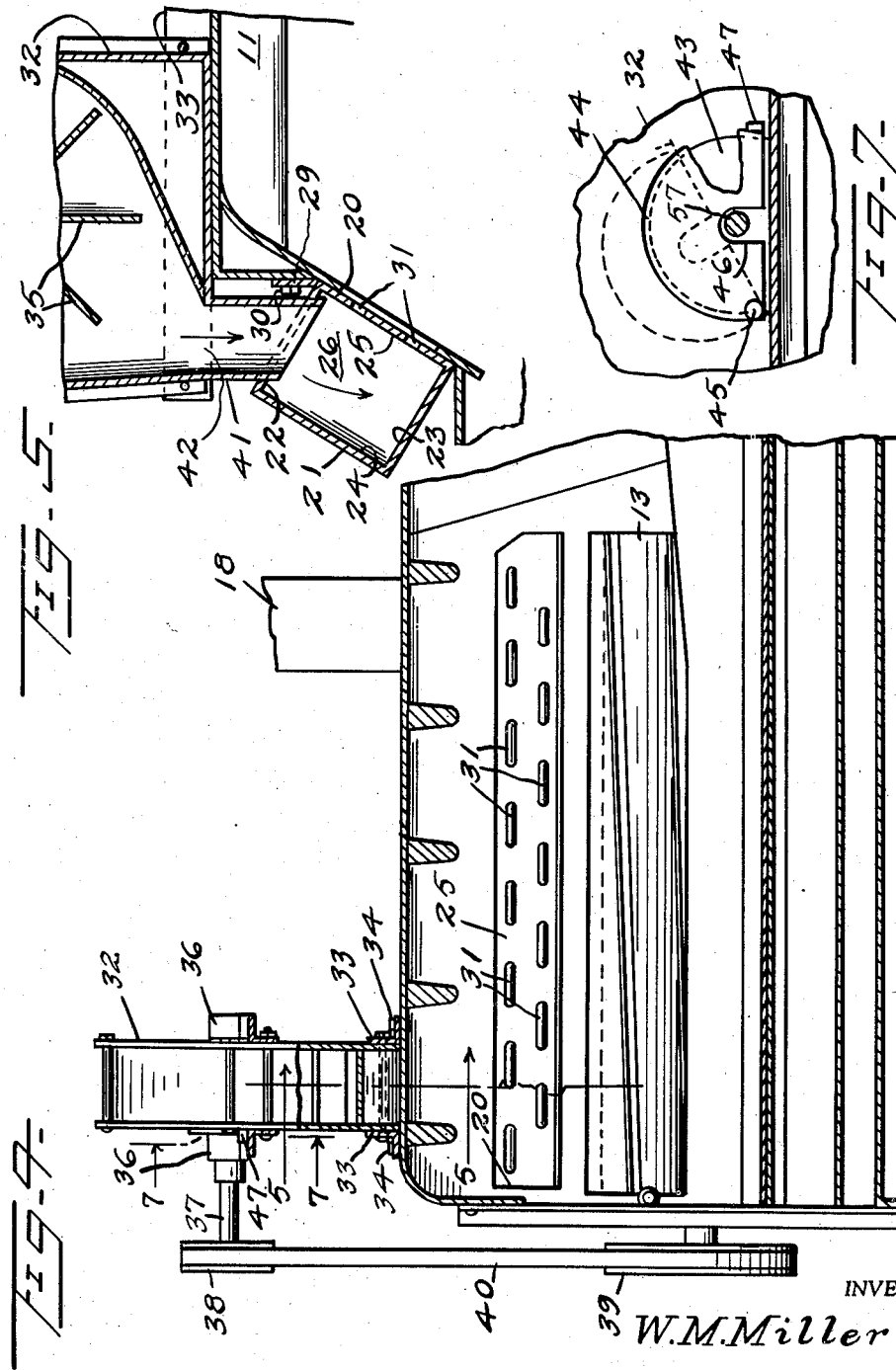

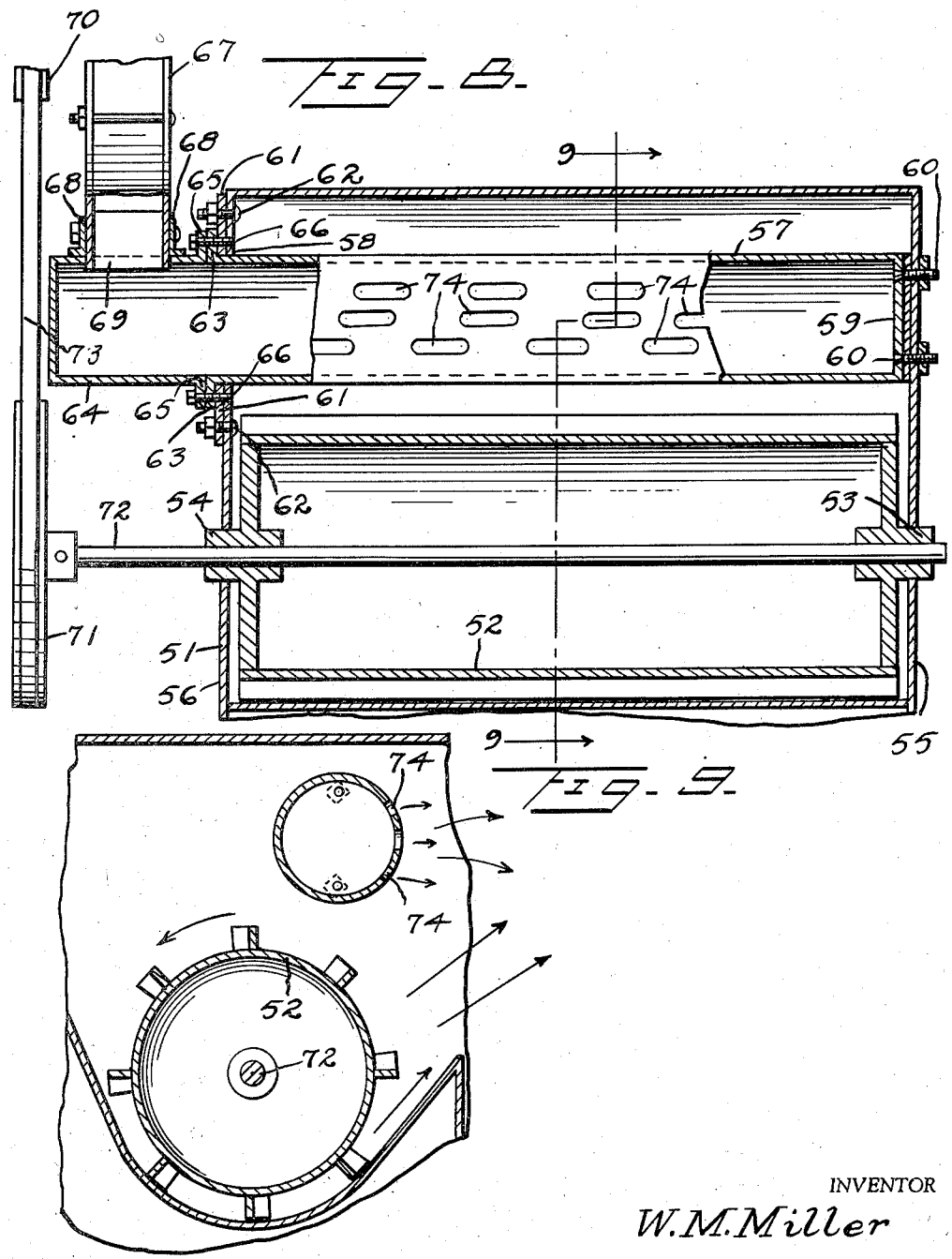

United States Patent Office 2,826,204
Patented Mar. 11, 1958

2,826,204

THRESHER HAVING PNEUMATIC SPREADER

William M. Miller, Junction City, Oreg.

Application June 9, 1955, Serial No. 514,263

1 Claim. (Cl. 130—27)

The present invention relates to a combine machine, and more particularly to a harvester thresher of the type disclosed in my prior Patent No. 2,571,469, dated October 16, 1951.

In harvesters and threshers or combines, there has been considerable difficulty and annoyance by reason of the uneven discharge and piling up of straw close to the threshing cylinder on the threshing or separating rack. This is particularly true where the straw is heavy or the ground is uneven.

The straw piles up because the straw drops down on the spinning cylinder, wrapping around it and thus causing the straw that falls to pile up and to slug the machine. The great difficulty, it seems, is that when the straw is forced up by the cylinder, it goes above the cylinder, and unless there is a means of throwing it back, it will drop down again upon the cylinder and wrap around it, causing the cylinder to become slugged and thus stopping the operation. The air forcing in causes the straw to be thrown back and away from the cylinder, so that when it drops, it does not drop vertically downward, but back toward the back side of the housing and to where the rack is located.

It is, therefore, an obect of this invention to provide means correlated with the threshing cylinder and the straw rack, whereby the straw will not clog up and in addition the straw delivered to the rack by the cylinder will be evenly distributed across the rack, to thereby effect a more thorough use of the entire width of the rack and provide for a more thorough separation of the grains from the straw.

Another object of this invention is to provide in a combine means discharging an air stream over the receiving end of the threshing rack which flows laterally across the rack in the direction of the straw discharged from the cylinder, so as to carry a substantial portion of the straw to the far side of the rack and in this manner evenly distribute the straw over the rack.

A further object of this invention is to provide a distributing means of this kind which includes a regulating valve, whereby the volume of air may be accurately controlled to effect the desired even distribution of the straw over the rack and the elimination of bunching or clogging of the straw at the intake side of the rack housing.

A still further object of the invention is to provide a distributing means of the class described above, which can be attached to existing machinery by unskilled labor.

Another object of the invention is to provide a distributing means of the character described above which can be attached to existing threshing equipment with minor modifications of the thresher housing and drive assembly.

Other objects and advantages will become apparent in the following specification when read in light of the attached drawings, in which:

Figure 1 is a side elevation of the invention shown attached to a harvester thresher of conventional design, partially broken away.

Figure 2 is a top plan view of the invention with parts broken away.

Figure 3 is a vertical cross-section of the device taken on the line 3—3 of Figure 2, looking in the direction of the arrows.

Figure 4 is a transverse cross-section of the invention taken on the line 4—4 of Figure 3, looking in the direction of the arrows.

Figure 5 is a fragmentary vertical cross-section of the blower and manifold taken on the line 5—5 of Figure 4, looking in the direction of the arrows.

Figure 6 is a plan view of the manifold partially broken away for clarity of illustration.

Figure 7 is a detailed vertical cross-section of the blower valve taken on the line 7—7 of Figure 4, looking in the direction of the arrows.

Figure 8 is a transverse cross-sectional view of a modified form of the invention.

Figure 9 is a vertical cross-section taken on the line 9—9 of Figure 8, looking in the direction of the arrows.

Now referring to the drawings in detail, wherein like reference numerals indicate like parts throughout the several figures, the reference numeral 10 indicates, generally, a combine harvester thresher of the type having a housing 11 containing grain straw separating bars 12 to which the grain straw is fed by means of a threshing cylinder 13 which is mounted for rotation in a threshing cylinder housing 14 which is connected to the housing 11 and in communication therewith by means of opening 15 extending between the housing 14 and the housing 11. The construction hereinbefore described is similar to that shown in Patent No. 2,123,879, dated July 19, 1938, and is here shown as one type of combine to which the invention may be attached.

The housing 11 includes a downwardly and forwardly sloped wall 16, the bottom edge 17 of which forms one edge of the opening 15 described above. The wall 16 extends upwardly and is sloped rearwardly from the cylinder 13. The housing 14 has connected to the top thereof a feedback conveyor 18 which returns unthreshed grain straw to the housing 14 for rethreshing. In the operation of the threshing combine 10, the straw and grain are cut by a cutter (not shown) and conveyed to the cylinder 13 by a conveyor (not shown).

In threshers or combines as hereinbefore described, there is a tendency for the incoming straw and grain to clog up adjacent the intake opening 15, so that the material will not be scattered over the surface of the separating means 12. In order to provide a means whereby the incoming straw grain will be more evenly spread over the intake end of the separating means 12, an auxiliary source of air blast, generally indicated at 19, is attached to the thresher 10 to assist in preventing the clogging of the intake opening 15. The sloped wall 16 is provided with a longitudinally extending opening 20 which extends generally parallel to the opening 15 and is spaced above the opening 15. A generally rectangular manifold 21 is provided with an upper wall 22, an opposite lower wall 23, a front wall 24 and a rear wall 25. Opposite end walls 26 and 27 are secured to the remaining walls to form a closed container. The end walls 26 and 27 are secured to the remaining walls by securing elements 28. The upper wall 22 is provided with a flange 29 and the flange 29 is secured to the wall 16 by means of bolts 30. The rear wall 25 is adapted to overlie completely the opening 20 in the wall 16, and has a multiplicity of elongated openings 31 extending therethrough to feed air from the manifold 21 to the housing 11.

A blower 32 is mounted on the top of the housing 11 by means of a pair of angle bars 33 extending across the housing 11. The angle bars are secured to the housing 11 by bolts 34. The blower 32 comprises a squirrel cage fan 35. The fan 35 is journalled in the blower housing by means of journal bearings 36. A drive shaft 37 extends from the journals 36 and has a pulley 38 secured to the outer end thereof. A pulley 39 is secured to the shaft of the drum 13 and the belt 40 connects the to the pulleys 38 and 39, so that upon rotation of the drum 13, the blower 32 will be driven.

A conduit 41 connects the discharge opening 42 of the blower 32 with the manifold 21. The intake opening 43 of the blower 32 is adapted to be closed by means of a valve plate 44 pivoted to the blower 32 by pivot 45. The valve plate 44 is notched on its lower edge at 46 to receive the shaft 37 therein. The valve plate 44 is provided with a handle 47 for moving the valve from its open to its closed position.

In the use and operation of the invention described above, the threshing machine 10 has the opening 20 cut therein by any suitable means, and the manifold 21 is attached to the wall 16, so that the opening 20 is completely covered by the wall 25. The openings 31 are in registry with the opening 20, so that air in the manifold 21 will flow through the openings 31 and 20 into the housing 11 and will thus assist in preventing the clogging of the opening 15 by the grain and straw. The blower 32 is positioned with its frame 33 on top of the threshing machine housing 11 and an extremely short conduit 41 connects the blower 32 with the manifold 21. This positioning of the manifold 21 and blower 32 materially reduces the friction of the air with the extended pipes necessary in the prior art structures.

Now referring to Figures 8 and 9, wherein a modification of the aforedescribed invention is disclosed, the reference numeral 51 indicates the housing of a threshing machine of a slightly different type than the threshing machine 10 disclosed in Figures 1 through 7. In this machine, a threshing cylinder 52 extends transversely of the machine and is journalled in bearings 53 and 54 extending through the walls 55 and 56 of the housing 51. The cylinder 52 discharges the grain straw to the right in Figure 9 onto separating members (not shown) in the same manner as the cylinder 13 operates.

A cylindrical manifold 57 is mounted through an opening 58 in the wall 56 of the housing 51 and has the inner end 59 thereof secured by bolts 60 to the wall 55. A collar 61 is secured to the outer face of the wall 56 by means of bolts 62, and the outer end of the manifold 57 is provided with a flange 63 which extends over the collar 61. A connector elbow 64 is provided with a flange 65 on its inner end which is adapted to engage the collar 63 of the manifold 57 and has bolt holes extending therethrough. The collar 61 has bolt holes aligning with the bolt holes in flanges 63 and 65, and these holes in the collar 61 are threaded to receive cap screws 66. This construction makes it possible for the collar 61 and manifold 57 to be assembled to the housing 51 without disassembling the housing 51.

A blower 67 is mounted on the connector elbow 64 by means of a flanged collar 68. The blower 67 has its discharge opening 69 in communication with the elbow connector 64 and the manifold 57. A pulley 70, fragmentarily shown in Figure 8, is connected to a pulley 71 on the shaft 72 of the threshing cylinder 52. A belt 73 drives the pulley 70 from the pulley 71. The manifold 57 is provided with discharge openings 74 which are directed in such a way that the clogging of the grain straw as it leaves the cylinder 52 is eliminated completely.

In the use and operation of the modification disclosed in Figures 8 and 9, the combine is modified by having an opening 58 cut to receive the manifold 57 and the manifold 57 is inserted within the housing 51 with the opening 74 directed to the rear of the machine, similarly to the openings 31 in the form of the invention disclosed in Figure 1.

It should be noted that neither modification requires the structural change in the combine beyond cutting holes to receive the attachment. It can thus be seen that this construction can be attached to existing combines by unskilled farm labor whenever necessary.

Having thus described the preferred embodiments of the invention, it should be understood that numerous modifications and structural adaptations may be resorted to without departing from the scope of the appended claim.

What is claimed is:

In combination, a thresher having an elongated separator housing in which are mounted longitudinally extending grain separating means, a threshing cylinder rotatably mounted in said housing and arranged to discharge grain and straw onto said separating means, said threshing cylinder extending between a pair of spaced parallel walls, one of said walls having an opening therethrough, a tubular air manifold extending through said opening and across said housing in parallel relation to and slightly above said cylinder, securing means between the inner end of said manifold and the other of said walls, securing means between the manifold and the wall through which it extends, said manifold having a plurality of air outlets therein only on the side thereof toward said separating means, and means secured to said manifold for supplying air to said manifold.

References Cited in the file of this patent
UNITED STATES PATENTS

| | | |
|---|---|---|
| 792,516 | Hanlon et al. | June 13, 1905 |
| 796,117 | Dunkelberger | Aug. 1, 1905 |
| 2,571,469 | Miller | Oct. 16, 1951 |